US008448237B2

(12) United States Patent
Rice et al.

(10) Patent No.: US 8,448,237 B2
(45) Date of Patent: May 21, 2013

(54) VIRTUAL PRIVATE INTERNET

(75) Inventors: Joseph Allen Rice, Ballston Lake, NY (US); Brandon Matthew Castagna, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/181,151

(22) Filed: Jul. 12, 2011

(65) Prior Publication Data

US 2013/0019283 A1 Jan. 17, 2013

(51) Int. Cl.
*G06F 9/00* (2006.01)

(52) U.S. Cl.
USPC .................................. 726/15; 726/1

(58) Field of Classification Search
USPC ............................. 726/1, 4, 15; 709/223, 225
See application file for complete search history.

(56) References Cited

U.S. PATENT DOCUMENTS

| | | |
|---|---|---|
| 7,418,457 B2 | 8/2008 | Kaler et al. |
| 7,451,157 B2 | 11/2008 | Kaler et al. |
| 7,721,322 B2 * | 5/2010 | Sastry et al. ...................... 726/1 |
| 7,930,214 B2 | 4/2011 | Knauerhase et al. |
| 7,957,994 B2 | 6/2011 | Brown et al. |
| 7,979,379 B2 | 7/2011 | Voegele et al. |
| 7,979,554 B2 | 7/2011 | Ho et al. |
| 7,984,096 B2 | 7/2011 | Beoughter et al. |
| 8,020,051 B2 | 9/2011 | Ziegler |
| 8,041,760 B2 | 10/2011 | Mamou et al. |
| 8,051,430 B2 | 11/2011 | Rapp |
| 8,060,553 B2 | 11/2011 | Mamou et al. |
| 8,069,057 B2 | 11/2011 | Choubey et al. |
| 8,090,831 B2 | 1/2012 | Brauel et al. |
| 8,135,785 B2 | 3/2012 | Malladi et al. |
| 8,140,582 B2 | 3/2012 | Chen et al. |
| 8,140,615 B2 | 3/2012 | Miller et al. |
| 8,141,151 B2 | 3/2012 | Hunter et al. |
| 8,146,099 B2 | 3/2012 | Tkatch et al. |
| 8,156,140 B2 | 4/2012 | Roshen et al. |
| 8,156,179 B2 | 4/2012 | Parmar et al. |
| 8,161,500 B2 | 4/2012 | Tan et al. |
| 8,183,994 B2 | 5/2012 | Staab |
| 8,195,803 B2 | 6/2012 | Zhang et al. |
| 8,196,145 B2 | 6/2012 | Miller et al. |
| 2002/0188513 A1 | 12/2002 | Gil et al. |
| 2003/0074367 A1 | 4/2003 | Kaler et al. |

(Continued)

OTHER PUBLICATIONS

Giordano, DNS-Based Discovery System in Service Oriented Programming, Advances in Grid Computing—EGC 2005, pp. 840-850, Springer-Verlag Berlin Heidelberg.

(Continued)

*Primary Examiner* — Samson Lemma
(74) *Attorney, Agent, or Firm* — Banner & Witcoff, Ltd.; Michael A. Springs

(57) ABSTRACT

A virtual private internet may include various network components, including an enhanced service domain name server (DNS), an enhanced service router, and an enhanced service gateway, which all access service policy information stored in an enhanced service repository. The network components in the virtual private internet perform common service processing tasks for routing service requests across firewalls and other network boundaries. The network components also execute other service policies, such as logging, message format translation, and protocol bridging for each service request processed by the network. Updates to services may be implemented in the virtual private internet via changes to service policy information stored in the enhanced service repository.

20 Claims, 5 Drawing Sheets

U.S. PATENT DOCUMENTS

| | | | |
|---|---|---|---|
| 2004/0236633 | A1 | 11/2004 | Knauerhase et al. |
| 2005/0177602 | A1 | 8/2005 | Kaler et al. |
| 2006/0020646 | A1 | 1/2006 | Tee et al. |
| 2007/0118878 | A1* | 5/2007 | Sastry et al. .................. 726/3 |
| 2008/0046335 | A1 | 2/2008 | Zhou |
| 2008/0313648 | A1* | 12/2008 | Wang et al. .................. 719/315 |
| 2009/0070478 | A1 | 3/2009 | Herman et al. |
| 2010/0023491 | A1 | 1/2010 | Huang |

OTHER PUBLICATIONS

Callaway, An Autonomic Service Delivery Platform for Service-Oriented Network Environments, Nov. 7, 2007, pp. 1-70, PHD Preliminary Examination, Department of Electrical and Computer Engineering, North Carolina State University.

ISR & WO mailed Sep. 27, 2012 from PCT Application PCT/US12/45164.

Ludwig et al., "Catalog-based service request management", IMB Systems Journal, vol. 46, N. 3, Dec. 2007 (retrieved on Sep. 4, 2012), Retrieved from the Internet http://citeseerx.ist.psu.edu.

Office Action dated Oct. 15, 2012 from U.S. Appl. No. 13/181,145.

Office Action dated Mar. 11, 2013 from U.S. Appl. No. 13/181,145.

Office Action dated Feb. 21, 2013 from U.S. Appl. No. 13/181,141.

* cited by examiner

VIRTUAL PRIVATE INTERNET

CROSS REFERENCE TO RELATED APPLICATIONS

This application is related to U.S. application Ser. No. 13/181,141 and U.S. application Ser. No. 13/181,145, which were filed concurrently with this application and which are herein incorporated by reference in their entirety.

TECHNICAL FIELD

Aspects of the invention generally relate to a virtual private internet that may be used to publish, connect, and secure services both within a single private network and between multiple private networks. In particular, each component of the network may perform common service processing tasks driven by standardized service policies that may be managed in a centralized repository.

BACKGROUND

The Internet provides ubiquitous connectivity that is quick, open, and enables clear communication and exchange of ideas. Unfortunately, the Internet is not secure enough for many confidential, proprietary exchanges that occur within private networks such as those maintained by corporations, schools, governmental agencies, and the like.

A private network (e.g., a corporate network) utilizes encryption to create a protected network that is secure. However, a private network is not open enough and instead creates barriers to agility. In particular, services within a private network are routed and accessed by point-to-point connections that are customized for each service. When changes need to be made to how services are provisioned and/or when new services need to be offered, there is no central place to advertise or manage access to the changes and/or new services. There is also no consistent way to connect users to each service in a secure, reliable and easy-to-provision way.

Today, in large corporations, there are tens of thousands of servers that function as hard-wired and hand-configured components. Under this scenario, it is very difficult to connect together a system that provides adequate speed, security, agility, and extensibility. In particular, this network configuration makes organizing cross-connectivity and integration across groups of people in a corporation challenging.

Moreover, network processes in private networks are implemented manually and in an ad-hoc way using information technology (IT) systems for performing steps such as defining, designing, procuring, building, developing, testing, promoting, certifying, and launching physical servers, network connectivity, and/or security capabilities. To implement these processes, conventional networks within an organization such as a corporation include tightly coupled layers of network components, manual configurations, and/or embedded code.

Increasingly, businesses need the ability to deploy IT systems in a fast, robust, secure, and extensible way. Moreover, services within and across business domains need to be connected in a governed and agile way.

Therefore, there is a need for a network implementation that would allow network components within a private network (e.g., corporate network, and the like) to have the same ease of connectivity as the Internet but also allow the ability to enforce policies and security as in a private network

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, non-transitory computer readable media, and apparatuses for implementing a virtual private internet that handles common tasks such as security, content-based routing, logging, message format translation, and protocol bridging. This scheme may be implemented by configuring network components to perform these common service processing tasks driven by standardized service policies that may be managed within a centralized repository.

Other aspects of the disclosure relate to a virtual private internet that includes an enhanced service DNS server which may resolve service uniform resource locators (URLs) into service addresses, an enhanced service router that is configured to interpret the services being called and to route the requests in a way that delivers the best quality of service, an enhanced service repository that may serve as a secure, central, easy-to-use storage device to discover and publish new services or content within a private network, and an enhanced service gateway that may aid in deploying and registering services.

Yet other aspects of the disclosure relate to a service mediation framework that allows network devices within a network to communicate with one another in a standardized format and handle service requests.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, there is a need for a network solution to deliver services and/or products better, faster, and cheaper in a way that allows for high availability, maximal flexibility, and improved speed to market. The islands of infrastructure common in today's network systems need to be changed into networks that deliver composite services across business domain boundaries.

Figure 1:
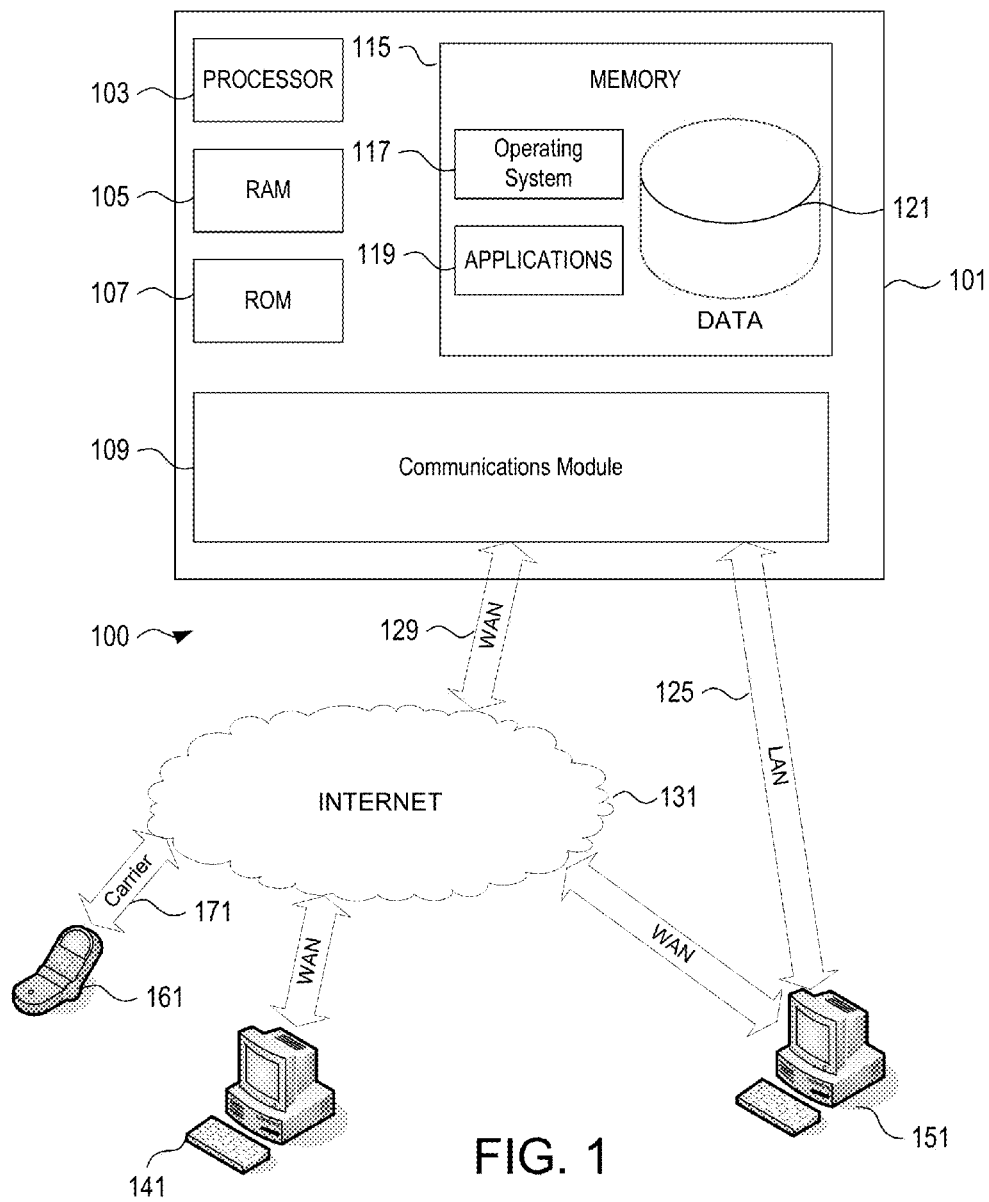
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include an enhanced network services device 101 wherein the processes discussed herein may be implemented. The enhanced network services device 101 may have a processor 103 for controlling overall operation of the enhanced network services device 101 and its associated components, including random-access memory (RAM) 105, read-only memory (ROM) 107, communications module 109, and memory 115. Processor 103 and its associated components may allow the enhanced network services device 101 to run a series of computer-readable instructions related to providing common service functions such as security, routing, and logging of messages. Processor 103 may also direct enhanced network services device 101 to perform tasks such as logging, message format translation, and protocol bridging within a private network.

Enhanced network services device 101 typically includes a variety of computer readable media. Computer readable media may be any available media that may be accessed by enhanced network services device 101 and include both volatile and nonvolatile media, removable and non-removable media. By way of example, and not limitation, computer-readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by enhanced network services device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, data, and the like to digital files.

Although not shown, RAM 105 may include one or more applications representing the application data stored in RAM 105 while the enhanced network services device 101 is on and corresponding software applications (e.g., software tasks) are running on the enhanced network services device 101.

Communications module 109 may include a microphone, keypad, touch screen, and/or stylus through which a user of enhanced network services device 101 may provide input, and may also include one or more of a speaker for providing audio output and a video display device for providing textual, audiovisual and/or graphical output.

Software may be stored within memory 115 and/or storage to provide instructions to processor 103 for enabling enhanced network services device 101 to perform various functions. For example, memory 115 may store software used by the enhanced network services device 101, such as an operating system 117, application programs 119, and an associated database 121. Also, some or all of the computer executable instructions for enhanced network services device 101 may be embodied in hardware or firmware.

Enhanced network services device 101 may operate in a networked environment supporting connections to one or more remote computing devices, such as computing devices 141, 151, and 161. The computing devices 141, 151, and 161 may be personal computing devices or servers that include many or all of the elements described above relative to the enhanced network services device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, enhanced network services device 101 may be connected to the LAN 125 through a network interface or adapter in the communications module 109. When used in a WAN networking environment, the enhanced network services device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

Additionally, one or more application programs 119 used by the enhanced network services device 101, according to an illustrative embodiment, may include computer executable instructions for invoking functionality related to communication including, for example, email, short message service (SMS), and voice input and speech recognition applications (e.g., for transmitting service request information and/or receiving service responses, and the like). In addition, the application programs 119 may include computer executable instructions for invoking user functionality related to accessing a centralized repository for performing various service tasks like routing, logging, and protocol bridging.

Embodiments of the disclosure may include forms of computer-readable media. Computer-readable media include any available media that can be accessed by an enhanced network services device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor 103 on enhanced network services device 101. Such a processor may execute computer-executable instructions stored on a computer-readable medium.

Figure 2:
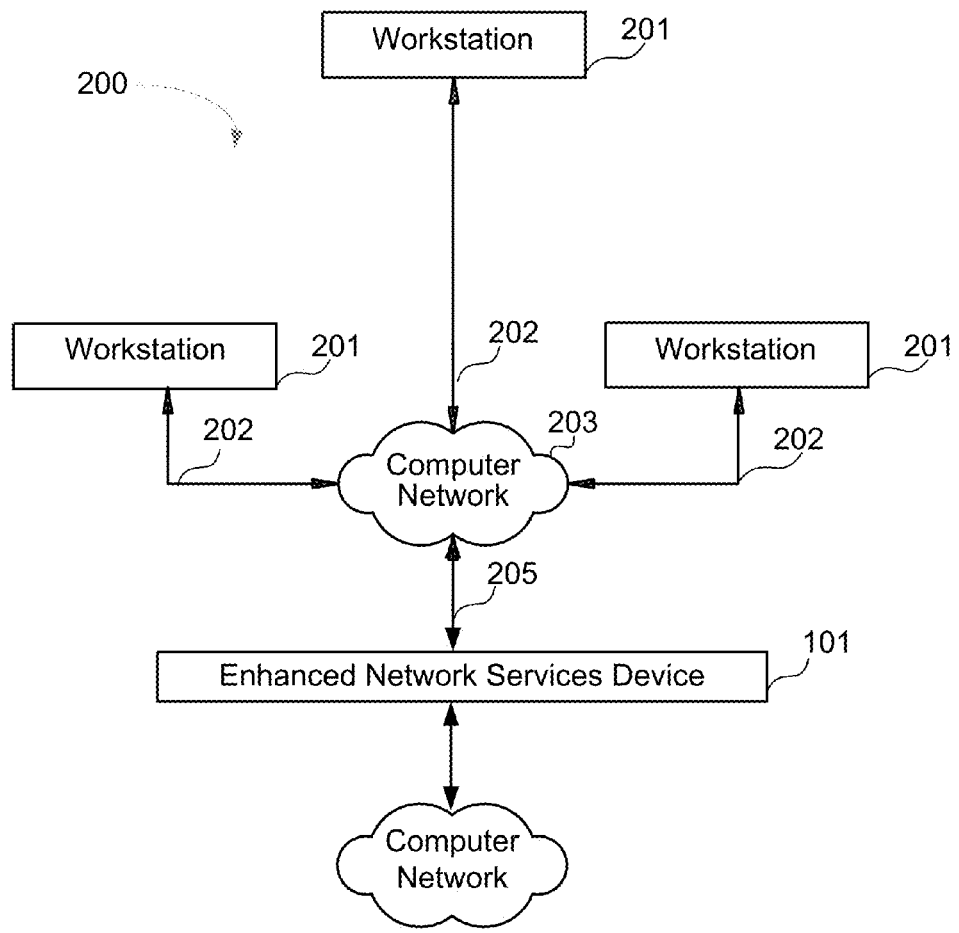
FIG. 2 is an illustrative block diagram of workstations and servers that may be used to implement the processes and functions of one or more aspects of the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to enhanced network services device 101. Workstations 201 may include many of the same hardware/software components as enhanced network services device 101. In some embodiments, workstations 201 may represent data stores for storing service policy data and metadata used by enhanced network services device 101. In other embodiments, workstations 201 may represent various types of enhanced network services devices 101 within network 200, including an enhanced service DNS server, enhanced service router, enhanced service repository, and/or an enhanced service gateway. In system 200, enhanced network services device 101 may be any suitable server, processor, computer, or data processing device, or combination of the same. Enhanced network services device 101 may be used to process the instructions received from one or more users or one or more other devices (e.g., workstations 201).

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and enhanced network services device 101, such as network links, dial-up links, wireless links, hard-wired links, and the like.

The steps that follow in the Figures may be implemented by one or more of the components in FIGS. 1 and 2 and/or other components, including other computing devices.

In accordance with various aspects of the disclosure, methods, computer-readable media, and apparatuses are disclosed that allow an entity, such as a company, government agency, university, and the like, to implement advanced methodologies for the creation of a framework and virtual private internet that may allow network components to receive service policy information in a standardized format from a centralized repository. In general, within the framework and virtual private internet, the content of various messages transported may drive the integration of network components. The data within a message may be used to describe how a message may need to be processed by any one of the network components. The framework may define common functions such that any vendor or technology implementation within the network will be the same. The framework may facilitate standard network tasks such as routing, authentication, authorization, auditing, and transformations. These tasks may be executed dynamically based on the content of the message.

In certain aspects, the service mediation framework may be fully flexible. The framework may define any number of standard message formats and/or protocols and teach each processing node (e.g., service router or service gateway) how to parse the message to determine which standard format it represents and how to process it (route it, and the like). The framework may include a pair of XML files called a service specification and an integration specification that when combined allow each node to identify, authenticate and fully parse and process any format or service described in each specification. Because of this flexibility the number of relevant examples may be large (sufficient to a broad array of variation as is common in a typical multinational firm which is the amalgamation of many acquisitions over time). Through enterprise architecture and standards, firms may over time be able to limit new service developments to target a small subset of desired formats such as standard soap/XML messages or industry standard formats. Likewise, as new internet standards emerge the framework may be flexible enough to add emerging trends such as raw XML or non-XML message format support. For each supported format the mediation framework may define a set of required elements (fields or headers) where common message-level metadata may be carried to drive routing or security or logging or similar run-time behavior.

In certain aspects, any message format in use in any enterprise may be used and exchanged. The message format may need a consistent way in which it delivers key information (identity, routing, logging, and the like) so that a service and integration specification may be written on how to process that message. Then any node that may be configured to act as a service router or service gateway, tied to the enterprise service repository using the common XML control file interface and leveraging the service mediation framework, may process the request type and route appropriately. This overlay network may allow once incompatible cross-vendor and cross-technology components to interoperate and process flexibly a vast array of message exchange patterns, message formats, and integrations. The overlay network may also allow the cross-business exchange of framework specifications to enable intracorporate communication and business exchange of highly customized information.

As used herein, a service request may relate to a variety of services provided by the network maintained by an organization. For instance, if the organization is a bank, the network maintained by the bank may provide services such as opening a bank account, registering for a credit card, and/or applying for a loan.

Each network component within the service framework may possess enhanced features that allow the component to access a datastore of detailed service policy metadata and data and implement service functions based on the service policy metadata/data. For instance, when the enhanced network services device 101 is an enhanced service router and/or an enhanced service DNS server, the device 101 may access routing policy information to determine a service address of a service provider and/or service routing policy information to transmit the service request to a preferred service provider of the requested service. In addition, when the enhanced network services device 101 is an enhanced service gateway, the device 101 may access and implement other types of service policy information, such as those related to security (e.g., authentication and/or authorization), protocol bridging, and format translation. Moreover, when the enhanced network services device 101 is a service repository, the device 101 may store and/or export service policy data/metadata in a common format (e.g., based on a standard) and may include information on all of the service policies commonly used within a private network.

Figure 3:
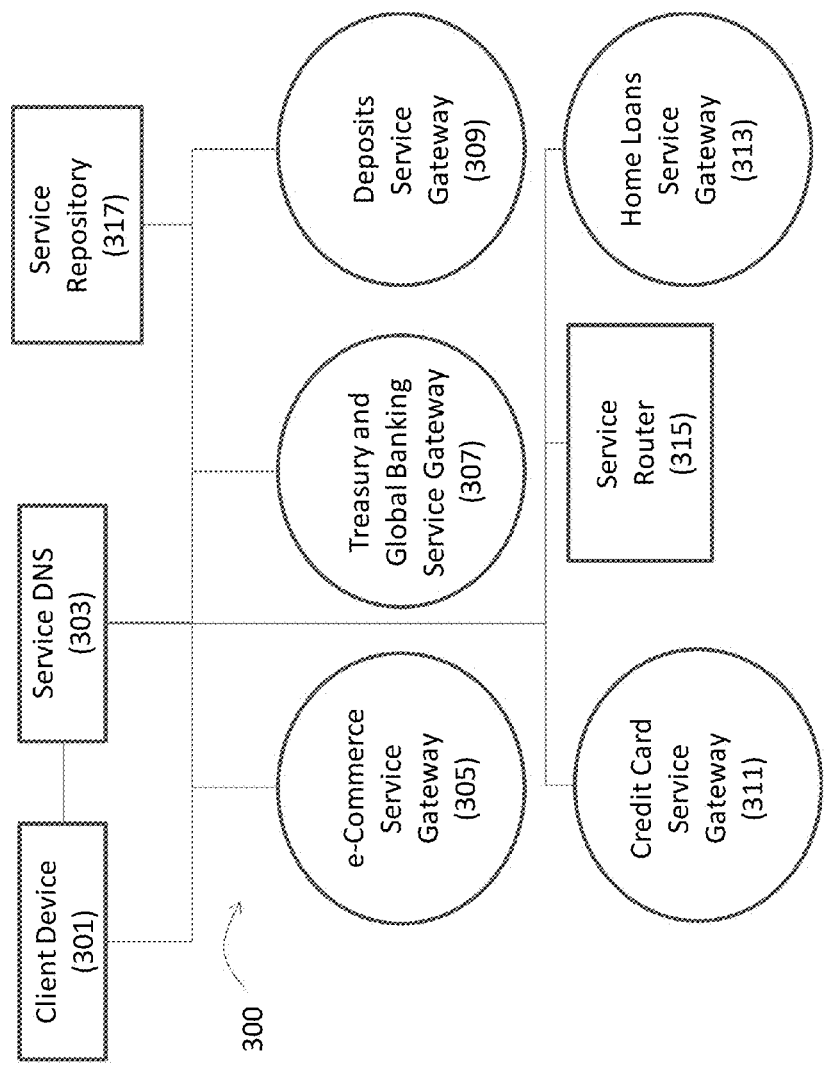
FIG. 3 shows an example network within an organization such as a bank that includes various service mediation framework devices for handling data communicated within the network, in accordance with at least one aspect of the disclosure.

FIG. 3 shows an example network 300 within an organization such as a bank that includes various service mediation framework devices for handling data communicated within the network 300, in accordance with certain aspects of the disclosure. Various departments with the bank may communicate over network 300 and each department may have its own enhanced service gateway. For example, FIG. 3 shows an enhanced service gateway for an e-Commerce department 305, treasury and global banking department 307, deposits department 309, credit card department 311, and home loans department 313. One of ordinary skill in the art would recognize that each of the service gateways 305-313 may in fact be a cluster of service gateways 305-313 located within each bank department.

In the network 300, a client device 301 (e.g., user terminal, network server, and the like) within the bank may request a service in a variety of ways, including by a user inputting a service uniform resource locator (URL) into a browser running on device 301 and/or through a message transmitted from the client device 301. In some embodiments, client device 301 may actually represent multiple client devices 301. When a user of client device 301 initiates a web service by inputting a service URL into a browser, the service request may be transmitted to an enhanced DNS server 303, and the enhanced service DNS server 303 may resolve the service URL (e.g., the URL of a service provider) into a service address of a service provider for the service URL. For example, a service URL for accessing sports content may be "sports," meaning that a user may access a preferred service provider for sports content within a private network by typing in the word "sports" into a browser. Similarly, the service URL for accessing the latest news content may be "news," and the service URL for accessing the latest weather information may be "weather." One of ordinary skill in the art would recognize that alternative naming conventions may be used to designate a service URL.

In general, a service request may represent a higher order construct that specifies a desired resource. For instance, if a user initiates a service request for "sports," the enhanced service DNS server 303 may access policy definition metadata stored on an enhanced service repository 317 that specifies a particular sports content provider. If the same user initiates this service request at a later date, the policy definition metadata for this service request may have changed during the interim; if so, the enhanced service DNS server 303 may access policy definition metadata that specifies that the service request for "sports" should be routed to a different sports content provider.

Other types of service requests may not involve a user-web service interaction; these service requests may be communicated directly between different network components. These server-server service interactions may involve various network resources (e.g., enhanced service gateways 305-313, enhanced service router 315, and the like) and may request that a service provider (e.g., one of the servers within the network) perform various network service tasks (e.g., authentication, logging, format translation, and the like) for a service requestor server. Similar to the user-web service interaction described in the previous paragraph, the service requestor (e.g., enhanced service router 315, enhanced service gateways 305-313, and the like) may access relevant service policy information stored in enhanced service repository 317 to perform the requested service. Also, as before, the service requestor may access and implement a service task that is consistent with the latest version of the service policy information stored in enhanced service repository 317.

In general, when the service request is a web-based browser interaction, the request may first be routed to an enhanced service DNS server 303 within the bank network 300, which may access routing policy metadata and data for the service request from the enhanced service repository 317. In some aspects, the enhanced service repository 317 may export a file including the routing policy information in Extensible Markup Language (XML) format to the enhanced service DNS server 303. Once the enhanced service DNS server 303 obtains the routing information (e.g., a destination service address), server 303 may route the service request to an appropriate enhanced service gateway 305-313 that may handle the service request.

For server-server service interactions, when a client device 301 requests a service, the service request may not be first routed to the enhanced service DNS server 303. Instead, these service requests may be routed directly to an enhanced service router 315 and/or enhanced service gateways 305-313 (discussed further below). For instance, the service router 315 may aid in routing a service request to a predetermined queue for any message-oriented middleware.

In the process of routing the service request to one or more enhanced service gateways 305-313, the service request may also be routed to enhanced service router 315, which may also aid in routing the service request to an appropriate destination (e.g., across firewalls, clouds, intranets, extranets, and the like). In conventional systems, to access a service, a user must select a conventional URL on a web browser to call a web page. When the URL is selected, the user is connected to a single backend system (e.g., the service provider server) based on the URL. The enhanced service router 315, on the other hand, may allow a client device 301 to request a service using content-based routing. With this approach, instead of always using the same route to connect to a service provider or instead of using the same service provider to handle a given type of service request, the enhanced service router 315 may access routing policy metadata and data in enhanced service repository 317 to dynamically determine the best possible route and/or the best possible service provider for a given service request at the time that the service request is made. For instance, one service provider may be better than another service provider because of lower cost associated with providing the service.

Each of the enhanced service gateways 305-313 and the enhanced service router 315 may access metadata and data stored in enhanced service repository 317 to determine relevant policies that may need to be enforced on the service request. In some aspects, each of the components 301-317 within network 300 may be appliances configured to receive/ transmit data from/to any other component 301-317 in XML format, among other formats. In addition, each appliance may be configured to employ Extensible Stylesheet Language Transformations (XSLT) to allow one appliance to communicate with another appliance in a standard format.

Once the service request is routed to the appropriate destination (e.g., one of the enhanced service gateways 305-313, an intranet/extranet service provider), one of the enhanced service gateways 305-313 may transmit an appropriate response back to client device 301. Once again, in order to route the response to the service request back to client device 301, one of the enhanced service gateways 305-313 may access routing policy information from enhanced service repository 317.

In some aspects, network 300 may be thought of as a virtual private internet. When a service requestor (e.g., client device 301, enhanced service gateways 305-313, and the like) requests a service within virtual private internet 300, the service request may be routed to one or more devices in virtual private internet 300 through various firewalls, and the like before ultimately being transmitted to a service provider. Within the virtual private internet 300, a mesh of appliances 301-317 may communicate through pre-negotiated channels to resolve a service request. Enhanced service repository 317 may export an XML file that details various service policies to each device 301-315 so that each of the devices 301-315 may enforce these policies. Because the devices 301-315 may access a centralized enhanced service repository 317 to import policies and transmit service requests of all types within the virtual private internet 300, barriers to connectivity, agility, and security may be eliminated within virtual private internet 300.

In some aspects, the information stored within the enhanced service repository 317 may be updated periodically when the need arises. For instance, when a new service comes online within one of the departments within the bank, a set of policies governing that service may be added to enhanced service repository 317. Similarly, information within the enhanced service repository 317 may be updated when a service needs to be routed differently (e.g., because an older service URL has now become inactivated, and the like). In this way, the implementation of service policies may be automated and data-driven rather than driven through manual intervention.

The enhanced service gateways 305-313 may be configured to control a variety of service policies. Just as the enhanced service DNS server 303 and the enhanced service router 315 may access and implement routing policies by accessing policy metadata and data from the enhanced service repository 317, the enhanced service gateways 305-313 may access and implement other service policies stored in enhanced service repository 317, as outlined below.

The enhanced service repository 317 may store data related to operational (e.g., run-time) policies such as those relating to entitlement, routing, work load management, logging, protocol bridging, format translation, filtering, and/or business process management, among other things, for use/access by the enhanced service DNS server 303, enhanced service gateways 305-313, and/or enhanced service router 315. Policies related to entitlement may include details on security functions such as authentication (e.g., establishing identity through a credential), authorization (e.g., determining if access is authorized for a privileged resource), and auditing of services and/or service requests. Policies related to routing may define how to decide where to route a given service request or a response to a service request (e.g., DNS/QUEUE resolution, site selection, content or context based routing, and the like).

For instance, an example of context-based routing or decisioning, triggered by a run-time context, includes cost/performance-based routing (based on comparative costs per transaction and availability to lower-cost cloud computing versus higher cost and more resilient internal services on an entity controlled network). In this example, a service request may be routed in network 300 based on the lowest cost provider that meets the minimum availability and performance service level agreements (SLAs) for each request type. Another example of context-based routing or decisioning, triggered by a run-time context, includes value-based service level management, where the business value (transaction amount or business impact of failure) for each transaction type (or service request type) may be coded as metadata in enhanced service repository 317 and is used to determine which transactions (or requests) may be guaranteed processing and which may be throttled or redirected when resources become constrained or demand exceeds rated capacity. Yet another example of context-based routing or decisioning, triggered by a run-time context, includes resource-based timing, where the amount of resources (e.g., threads, memory, connections, time-out values, and the like) may be allocated based on granular measurements of available resources by provider and service type. A final example of context-based routing or decisioning, triggered by a run-time context may include the use of alternate path triggers. In this example, when virtual machine work-load management is configured, a service gateway 305-313 may determine that only some traffic may be served using dynamic content (from the active service provider virtual machine instances). Service gateways 305-313 may then route excess traffic to alternate internal service providers or adjust cache parameters in the message response header to trigger service of some requests via cached content that is still relevant but aged to a greater degree until demand subsides or additional dynamic service providers become available or more responsive.

In general, the ability of an enhanced service repository 317 to define significant triggers (driven by environment or run-time context) and to render resultant actions in a common way (e.g., XML) which may be acted upon by a diverse set of vendor tools throughout the network or even across multiple divisional or corporate boundaries may represent a breakthrough extension of federated connectivity and service management.

Policies related to work-load management may include information on how many and which network components may participate in responding to a service request (connection distribution, local load balancing, Virtual Machine (VM) level workload management (WLM), and the like). Policies related to logging may include information on when to log data (e.g., when a service request is made to measure performance metrics of the network such as the amount of time that the network takes to fulfill the service request, when access to a privileged network resource is granted or denied, when fraud is committed on the network, and the like.)

Policies related to protocol bridging may include information on how to change data from one format to another format (e.g., to allow one application to communicate with another). Policies related to format translation may include information related to editing data to make the data suitable for use in a given application (e.g., changing a double quotes to a single quote within a message, and the like). Policies related to filtering may define techniques (e.g., via style sheet filters, and the like) to strip away information that is not needed in a service transaction. For instance, if a network is providing a service related to obtaining a credit card, a filtering policy may specify that confidential and/or sensitive information such as the social security number of the service requestor be removed from the service request before transmitting the service request to a company that prints credit cards. Finally, policies related business process management may specify how complicated service requests may be divided into sub-requests. In some embodiments, business process management policies may describe orchestration of discrete services into a composite service.

Examples of the types of metadata stored in enhanced service repository 317 may include the name of a given service request, the network route that needs to be taken to reach a service provider for each service request, logging information related to the service request, the expected amount of time for getting a response to the service request, and the like. In general, metadata may include any piece of information that defines the interaction between a service requestor and a service provider, determines the route that a service request must take to get to a service provider, and/or authenticates or authorizes a service request. The enhanced service repository 317 may also include a list of common functions for a given service and/or the policies that guide the use of these functions. The enhanced service repository 317 may export a file in a standardized format (e.g., XML) that any element (e.g., server) may process. The exported file may include information that allows the servers within a network to communicate about services via common protocols.

The specific service policy information stored in enhanced service repository 317 may be driven by a variety of factors, including which client device 301 is requesting the service, the type of service that the client device 301 is requesting, the time of day, the content of the service request message, and/or an overriding policy of the bank, among other things.

In certain aspects, the enhanced service repository 317 may define enough policies and metadata to cover all or a vast majority of all of the interaction points within an entity such as an organization. In some embodiments, the enhanced service repository 317 may export the policy information for service requests in a standard way. The data stored in and transmitted by the enhanced service repository 317 and/or the enhanced service DNS server 303 may be in a variety of formats, including XML.

In this way, if an organization (e.g., a financial institution, and the like) adds a new feature that depends on a service to its corporate network 300, the wait time for integrating the new feature to the corporate network 300 may be reduced drastically. Also, if changes are made to existing services, these changes may also be implemented in network 300 much more quickly. Thus, potential delays to market share that depend on this new feature may also likewise be reduced.

In summary, the virtual private internet 300 may include an enhanced service repository 317 which may represent a custom configuration of various service registries, an enhanced service DNS server 303 which may serve as a dynamic DNS that resolves virtual addresses into service addresses, an enhanced service router 315 configured to perform content-based routing by accessing routing policy information from the enhanced service repository 317, and an enhanced service gateway 305-313 configured to access various service policy information (as detailed above) from the enhanced service repository 317 to enforce and execute service policies. In addition, services may be referenced through a naming standard that specifies a service URL.

Each of these network components may function through a service mediation framework that defines how the components should store, enforce, communicate, and execute service processing tasks such as security, content based routing, logging, message format translation, and protocol bridging. These service processing tasks may be driven by standardized service policies that are stored in enhanced service repository 317. In this way, the virtual private internet 300 may take a collection of nodes running the service mediation framework integrated to the enhanced service DNS server 303, enhanced service gateways 305-313, enhanced service router 315, and enhanced service repository 317 so that the system can traverse firewalls and other process barriers that exist in conventional networks and that prevent rapid publication and consumption of services.

In certain aspects, the service mediation framework may aid all the service buses within a corporate network so that the service buses act in a consistent way with each other. Meanwhile, a virtual private internet may connect the disparate service buses together and allow network components to transcend firewall boundaries to create a federated network of service buses.

Figure 4:
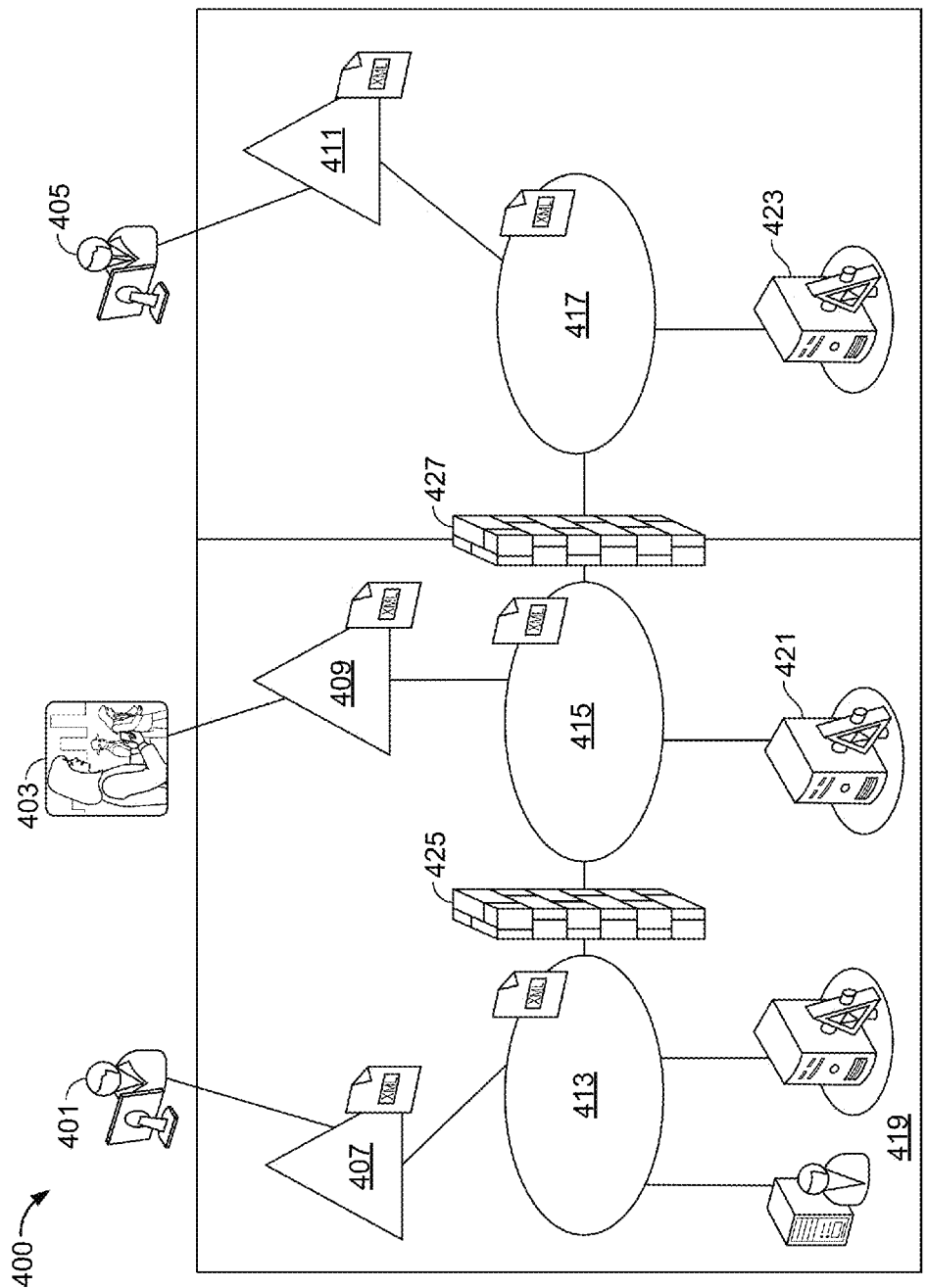
FIG. 4 shows an example network architecture that comprises a virtual private internet in accordance with at least one aspect of the disclosure.

FIG. 4 shows an example network architecture that comprises the virtual private internet in accordance with certain aspects of the disclosure. In FIG. 4, various service requestors 401, 403, and 405 may request services within a virtual private internet 400. While FIG. 4 shows only user terminals associated with service requestors 401, 403, and 405 (e.g., a for a web service request), service requestors 401, 403, and 405 may also include application servers and other network devices not associated with a user.

When service requestors 401, 403, and 405 request a service, the service request may be transmitted to an enhanced service DNS server and/or enhanced service router 407, 409, and/or 411. As discussed above, an enhanced service DNS server 407, 409, and/or 411 may aid in routing a web-based service request to an appropriate destination point by translating a service URL associated with the service request to a service address. Meanwhile, an enhanced service router 407, 409, and/or 411 may aid in routing other types of service requests (e.g., service requests involving server-server interactions, and the like) to an appropriate destination (e.g., service gateways 413-417, and the like). Both the enhanced service DNS server and enhanced service router 407, 409, and/or 411 may access routing policy information from an enhanced service repository (represented by the "XML" icon attached to a given device in FIG. 4.)

The service request may then be routed to one or more appropriate enhanced service gateways 413, 415, and/or 417. Enhanced service gateways 413-417 may also contact an enhanced service repository for service policies (e.g., logging, protocol bridging, entitlement, and the like) needed to process the service request. In some aspects, enhanced service gateways 413, 415, and 417 may all be from different vendors within the same corporate network and/or from different corporate networks altogether. Virtual private internet 400 may also include firewalls 425 and 427 between enhanced service gateways 413, 415, and 417. In routing a service request to an enhanced service gateway 413, 415, and/or 417, enhanced service DNS server and/or enhanced service router 407-411 may also be configured to access service policy information from an enhanced service repository to allow a service request and/or other message to traverse firewalls 425 and/or 427 to reach a destination node in virtual private internet 400. In addition, enhanced service gateways 413-417 may themselves access service policy information from an enhanced service repository to traverse firewalls 425 and/or 427.

Because a service gateway 413-417 may be placed on both sides of a firewall, it may represent both the source IP and destination IP for that firewall so that a single firewall rule may allow a broad array of communication on a single port and protocol between two service gateway nodes. This implementation eliminates the firewall's ability to limit traffic, since the service gateways 413-417 may accept any request and then forward that request though the firewall using pre-established connectivity. To restore the integrity of a corporate network, the service gateway 413-417 may add back any essential layer of authentication, authorization, audit, or message validation limiting traffic at least as well as the original firewall. Because the service gateway 413-417 may be controlled by a service mediation framework, the service gateway 413-417 may be fully metadata-controlled from a central repository; this implementation may enable extremely agile yet secure connectivity across multiple layers of traditional firewalls for a broad array of message and connection formats. Moreover, any header of message field may be standardized to contain needed credentials that enable automated controls and access limitations by a user or system.

Once all the requisite service processing tasks are completed at enhanced service gateways 413-417, the service request may be routed to the appropriate service provider 419, 421, and/or 423. For instance, in the case of a web service, the service provider 419-423 may represent a web server; in other cases, the service provider 419-423 may represent a database or mainframe server configured to handle a server-server interaction. In some aspects, service provider 419 may represent an intranet (on-premise e.g., for a corporation) web service provider, service provider 421 may represent an intranet mainframe service provider, and service provider 423 may represent an off-premise service provider on an affiliate network. When service provider 423 is an off-premise service provider on an affiliate network, enhanced service gateway 417 and enhanced service DNS server and/or enhanced service router 411 may also belong to the off-premise affiliate network.

Once service providers 419-423 receive a service request, the request may be processed and a response may be transmitted from service providers 419-423 back to service requestors 401-405. The route taken by the response from service providers 419-423 to service requestors 401-405 may depend again on routing policies accessed from an enhanced service repository by the various nodes of virtual private internet 400.

In some aspects, a service mediation framework may define how each one of the components within virtual private internet 400 handles service requests. In other words, the service mediation framework focuses on the use of common service policies (e.g., routing, logging, entitlement, and the like.) Meanwhile, the virtual private internet 400 may include multiple service gateways 413-417 interacting with one another to span firewalls 425 and 427 within a corporate setting or to span other entities such as other corporations (e.g., other banks) In this way, the virtual private internet 400 may federate multiple lines of business across various networks.

Also, in this way, instead of creating point-to-point connections between service requestors and providers, reusable enhanced service gateways 413-417 may be implemented in a way that does not require infrastructure changes when changes to existing services are made and/or when new services come online within a network. For instance, if a service request needs to be routed from enhanced service router 409 to enhanced service gateway 417, instead of creating a point-to-point connection between router 409 and gateway 417 with a new firewall rule, router 409 may transmit the service request to enhanced service gateway 415 which may use the pre-provisioned firewall rule through firewall 427 to transmit the service request to enhanced service gateway 417. In this way, instead of waiting for a network to establish a new firewall rule to route a service request to an appropriate destination, components of virtual private internet 400 may utilize pre-established tunnels via various intermediate components to route service requests to a predetermined destination, thereby reducing the amount of time taken to route the service request to a service provider.

The virtual private internet 400 may strike a balance between agility and latency in communicating between different network components. In this aspect, agility may refer to how much time it takes to create a new connection between two nodes and latency may refer to how much time it takes to traverse a connection between two nodes. For instance, in the above example of traversing a firewall 427 to transmit a service request from enhanced service router 409 to enhanced service gateway 417, using the pre-provisioned firewall rule through firewall 427 to transmit data to enhanced service gateway 417 may provide better agility; however, transferring data along this route may take a slightly longer amount of time (e.g., higher latency) than the amount of time taken if there was a direct point-to-point connection between enhanced service router 409 and enhanced service gateway 417. Generally, virtual private internet 400 may first try to optimize agility by using as many pre-provisioned communication paths as possible to quickly capture market share; over time, additional network connections in virtual private internet 400 may be provisioned to optimize performance and reduce latency.

Figure 5:
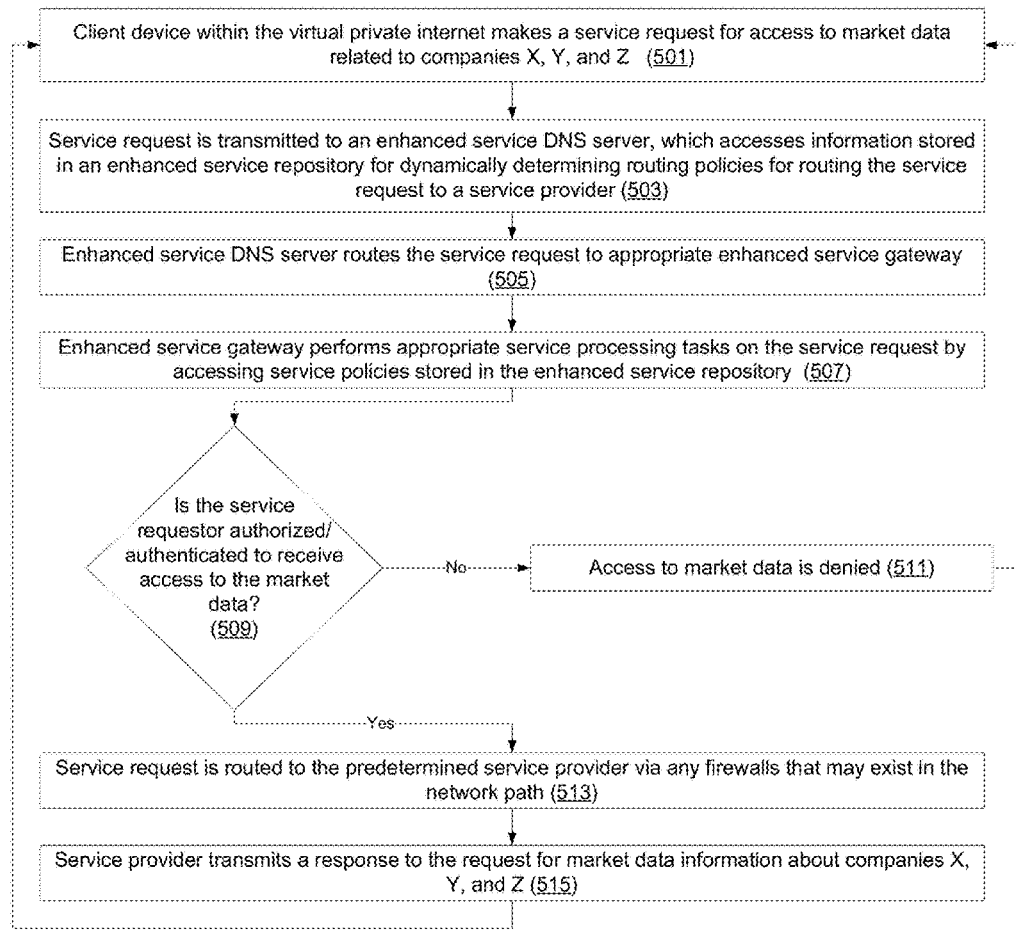
FIG. 5 shows an example method using a virtual private internet, in accordance with at least one aspect of the disclosure.

FIG. 5 shows an example method using a virtual private internet, in accordance with certain aspects of the disclosure. The example of FIG. 5 focuses on a web-based service request for stock market data related to various companies. The method shown in FIG. 5 may start out at step 501 where a device (e.g., client devices 401-405) within a virtual private internet may make a request for access to market data related to companies X, Y, and Z. The process may then move to step 503 where the service request may be transmitted to an enhanced service DNS server (e.g., enhanced service DNS servers 407-411) for dynamically determining a routing policy related to information about market data. Once the appropriate routing policy is determined (e.g., by accessing information stored in an enhanced service repository) based on the service URL in the service request and other factors (e.g., time of day, network utilization level, and the like) the enhanced service DNS server 407-411 may route the service request to a predetermined enhanced service gateway 413-417 in step 505.

Then, in step 507, the predetermined enhanced service gateway 413-417 may perform various service processing tasks in preparation for routing the service request to a predetermined service provider (e.g., authentication of the service requestor, logging of access information, message format translation, and the like). Enhanced service gateway 413-417 may access service policy information stored in an enhanced service repository to execute these service processing tasks.

The process may then move to step 509 where the enhanced service gateway 413-417 may decide if the service requestor 401-405 is authorized to receive the service. If the service requestor 401-405 is not authorized to receive the service, the process may move to step 511 where the service request may be denied. If the service requestor 401-405 is authorized to receive the service, the process may move to step 513 where the service request is routed to a predetermined service provider 419-423. In routing a service request to the appropriate service provider 419-423, enhanced service gateway 413-417 may need to access and execute service policies related to various load balancer rules and/or firewall rules. The service provider 419-423 may then transmit a response (e.g., the requested market data for companies X, Y, and Z) to the service request back to the client device 401-403 in step 515.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
   a centralized service repository configured to store service policy information related to a plurality of service policies, wherein the plurality of service policies include entitlement, routing, workload management, logging, protocol bridging, format translation, filtering, and business process management;
   a plurality of service routers configured to route a plurality of service requests to network components based on the routing policies stored within the centralized service repository, wherein at least one of the routing policies relates to routing the plurality of service requests through at least one firewall that connects a first network with a second network;
   a plurality of service gateways configured to perform a plurality of service processing tasks related to entitlement, routing, workload management, logging, protocol bridging, format translation, filtering, and business process management by accessing the service policy information stored within the centralized service repository,
      wherein the plurality of service gateways includes at least one appliance configured to process Extensible Markup Language (XML) files transmitted by the centralized service repository,
      wherein at least one of the plurality of service gateways is located in the first network and at least another one of the plurality of service gateways is located in the second network,
   a plurality of service domain name system (DNS) servers configured to dynamically translate service uniform resource locators (URLs) into service addresses by accessing the service policy information stored within the centralized service repository;
   a plurality of user terminals configured to transmit the plurality of service requests to at least one of the plurality of service routers and the plurality of service DNS servers; and
   a plurality of service providers configured to provide access to a plurality of privileged resources within the second network.

2. The system of claim 1, wherein the plurality of service requests are chosen from the group consisting of: opening a bank account, registering for a credit card, and applying for a loan.

3. The system of claim 1, wherein the workload management service policies define a number of network components that are needed to respond to at least one of the plurality of service requests.

4. The system of claim 1, wherein the logging service policies define when to measure an amount of time taken to respond to at least one of the plurality of service requests.

5. The system of claim 1, wherein the filtering service policies define when to strip away data that is not needed in a service transaction related to at least one of the plurality of service requests.

6. The system of claim 1, wherein the entitlement service policies define how to authenticate and authorize service requestors to access to the plurality of privileged resources.

7. The system of claim 1, wherein the routing service policies define how to route the plurality of service requests via content-based routing.

8. The system of claim 1, wherein the protocol bridging service policies define how to change data associated with the plurality of service requests from Hypertext Transfer Protocol (HTTP) to XML.

9. The system of claim 1, wherein the format translation service policies define how to edit data related to the plurality of service requests to make the data suitable for use with a given application.

10. The system of claim 1, wherein the business process management service policies define how complicated service requests are divided into sub-requests.

11. A computer-assisted method comprising:
    receiving a service request associated with a service from a server through a communication module associated with the computer;
    requesting access to a plurality of service policies related to the service request from a service repository through the communication module, wherein the plurality of service policies relate to entitlement, routing, workload management, logging, protocol bridging, format translation, filtering, and business process management;
    in response to the request for access to the plurality of service policies, receiving an Extensible Markup Language (XML) file with the plurality service policies;
    using a processor associated with the computer, analyzing the entitlement service policies in the XML file to determine if the server is authorized for a privileged resource specified in the service request;
    when the server is authorized for the privileged resource,
      (i) using the processor and based on the routing service policies, determining when a firewall needs to be traversed to access the privileged resource;
      (ii) using the processor and based on the routing service policies, when the firewall needs to be traversed, determining a pre-provisioned route to a service provider of the service that minimizes latency;
      (iii) using the communication module, routing the service request through the pre-provisioned route, wherein the pre-provisioned route includes the firewall and at least one intermediate node, wherein the at least one intermediate node is an appliance;
      (iv) receiving a response from the service provider through the communication module; and
      (v) using the communication module, routing the response to the server.

12. The computer-assisted method of claim 11, wherein the filtering service policies define when to strip away data that is not needed in a service transaction related to the service request.

13. The computer-assisted method of claim 12, further comprising: using a style sheet filter stored in a memory of the computer, stripping away confidential information from the service request after analyzing the filtering service policies.

14. The computer-assisted method of claim 11, wherein the protocol bridging service policies define how to change information within the service request from a first protocol used by the server to a second protocol used by the service provider.

15. The computer-assisted method of claim 14, wherein the first protocol is File Transfer Protocol (FTP) and the second protocol is Hypertext Transfer Protocol (HTTP).

16. A non-transitory computer-readable storage medium having computer-executable program instructions stored thereon that when executed by a processor, cause the processor to perform:
  (a) receiving a first request from a first service gateway located on a first network for a plurality of service policies related to a service, wherein the plurality of service policies are related to entitlement, routing, workload management, logging, protocol bridging, format translation, filtering, and business process management;
  (b) generating a first Extensible Markup Language (XML) file that includes first information related to the plurality of service policies, wherein the first information is also based on a network utilization level and a time of day in which the first request is made;
  (c) transmitting the first XML file to the first service gateway;
  (d) receiving an update to at least one of the plurality of service policies related to the service;
  (e) storing the updated at least one of the plurality of service policies;
  (f) receiving a second request from a second service gateway located on a second network for the plurality of service policies related to the service, wherein the first service gateway and the second service gateway are separated by a firewall;
  (g) generating a second XML file that includes second information related to the updated at least one of the plurality of service policies, wherein the second information is also based on a network utilization level and a time of day in which the second request is made;
  (h) transmitting the plurality of service policies with the updated at least one of the plurality of service policies to the second service gateway,
    wherein the plurality of service policies are configured to be enforced at the first service gateway and the second service gateway.

17. The non-transitory computer-readable storage medium of 16, wherein the first service gateway comprises an appliance.

18. The non-transitory computer-readable storage medium of 16, wherein the firewall separates a first and a second business unit within a bank.

19. The non-transitory computer-readable storage medium of 18, wherein the first business unit is a home mortgage loan department and the second business unit is a credit card department of the bank.

20. The non-transitory computer-readable storage medium of claim 19, wherein the service is related to access of home mortgage loan information for a service requestor within the credit card department.

* * * * *